UNITED STATES PATENT OFFICE.

OTTO H. BRAUSER AND MILES H. OAKES, OF AKRON, OHIO, ASSIGNORS TO THE WATERIZE CHEMICAL AND MANUFACTURING COMPANY, OF AKRON, OHIO, A CORPORATION OF OHIO.

WATERPROOFING COMPOSITION.

1,399,724.     Specification of Letters Patent.     Patented Dec. 6, 1921.

No Drawing.     Application filed November 22, 1919. Serial No. 339,996.

*To all whom it may concern:*

Be it known that we, OTTO H. BRAUSER and MILES H. OAKES, citizens of the United States, residing at Akron, in the county of Summit and State of Ohio, have invented new and useful Improvements in Waterproofing Compositions, of which the following is a specification.

This invention relates to a waterproofing composition and has particular relation to a waterproofing composition which is adapted to make cloth, leather, paper or the like water repellent.

The object of the invention is to provide an improved waterproofing composition which will be transparent and which will not injure or stain the article to which it is applied.

Another object is to provide a composition of the class above described which will preserve the fabric or other substance to which it may be applied and which will last indefinitely and may be easily and economically manufactured.

A still further object is to provide a waterproofing composition with which cloth, leather or other substances may be treated without closing the pores or interstices therein and which when it is so treated will not absorb water or other liquid by capillary attraction.

With the above objects and others in view, our invention consists in the combination and treatment of elements and the compounding of ingredients hereinafter described; it being understood that changes, variations and modifications may be resorted to which come within the spirit of the invention, and the scope of the claims hereunto appended.

Broadly, a waterproofing compound manufactured in accordance with this invention consists of the following ingredients: Paraffin, gasolene, benzol, unvulcanized rubber and peppermint oil. I prefer to mix the ingredients in the following proportions: One pound paraffin, one pint high test gasolene, six pints benzol, one ounce rubber and one dram peppermint oil. The paraffin is first melted, preferably by steam, and to the melted paraffin the gasolene is added; the rubber is added to the benzol which is churned until the rubber is thoroughly dissolved; to this mixture the paraffin and gasolene are added, the oil of peppermint is then added and the mixture is well agitated.

While rubber in any dissolvable form may be used, we prefer to use washed Pará rubber, or other rubber, which will not cloud the mixture and discolor the article on which the composition is used. The mixture of the above named ingredients as above set forth results in a clear, transparent liquid which in use is applied directly to the article to be used. The oil of peppermint may be omitted as it is not essential to the composition claimed.

Having thus described our invention what we claim as new and desire to secure by Letters-Patent is:—

1. A waterproofing composition consisting of paraffin, gasolene, benzol and rubber substantially as herein described.

2. That method of manufacturing a waterproofing composition comprising the following steps: first, melting paraffin and adding gasolene to the melted paraffin; second, the dissolving of rubber in benzol; third, adding the paraffin and gasolene to the benzol and rubber substantially as herein set forth.

In testimony whereof we have hereunto set our hands.

OTTO H. BRAUSER.
MILES H. OAKES.